(12) United States Patent
Childs et al.

(10) Patent No.: US 11,010,479 B2
(45) Date of Patent: May 18, 2021

(54) CYBER SECURITY FOR SPACE-SWITCHING PROGRAM CALLS

(71) Applicant: International Business Machines Corporation, Armonk, NY (US)

(72) Inventors: Bryan Childs, Poughkeepsie, NY (US); Peter Relson, Ulster Park, NY (US); Karl D. Schmitz, Poughkeepsie, NY (US); Michael P. Kasper, Poughkeepsie, NY (US); Kathryn Voss, New Paltz, NY (US); Kin Choi, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 256 days.

(21) Appl. No.: 16/148,096

(22) Filed: Oct. 1, 2018

(65) Prior Publication Data
US 2020/0104508 A1 Apr. 2, 2020

(51) Int. Cl.
*G06F 21/00* (2013.01)
*G06F 21/57* (2013.01)
(Continued)

(52) U.S. Cl.
CPC ........ *G06F 21/577* (2013.01); *G06F 12/0646* (2013.01); *G06F 21/64* (2013.01); *G06F 2212/1052* (2013.01); *G06F 2221/033* (2013.01)

(58) Field of Classification Search
CPC .... G06F 21/577; G06F 12/0646; G06F 21/64; G06F 2221/033; G06F 2212/1052; G06F 21/554
See application file for complete search history.

(56) References Cited

U.S. PATENT DOCUMENTS

| 5,551,013 A | 8/1996 | Beausoleil et al. |
| 5,574,873 A | 11/1996 | Davidian |

(Continued)

FOREIGN PATENT DOCUMENTS

WO 2008109770 A2 9/2008

OTHER PUBLICATIONS

Devanbu, et al. "Stack and queue integrity on hostile platforms," in IEEE Transactions on Software Engineering, vol. 28, No. 1, pp. 100-108, Jan. 2002, doi: 10.1109/32.979991. (Year: 2002).*

(Continued)

*Primary Examiner* — Don G Zhao
(74) *Attorney, Agent, or Firm* — Cantor Colburn LLP; Teddi Maranzano

(57) ABSTRACT

A system includes a memory system and a processing system operably coupled to the memory system. The memory system includes a plurality of address spaces. The processing system is configured to perform operations including creating a data space from within a primary address space and a primary address space number access list entry referencing the data space. An unauthorized caller routine in a home address space configured to issue a service request including an address space-switching program call from the home address space to a program call target routine in the primary address space. The address space-switching program call references the primary address space number access list entry in the primary address space. A vulnerability identifier associated with the program call target routine is created and logged based on one or more conditions indicative of a cross-memory integrity violation detected responsive to the service request.

18 Claims, 4 Drawing Sheets

(51) Int. Cl.
*G06F 12/06* (2006.01)
*G06F 21/64* (2013.01)

(56) References Cited

U.S. PATENT DOCUMENTS

| | | | |
|---|---|---|---|
| 5,701,408 | A | 12/1997 | Cornell et al. |
| 6,332,211 | B1 | 12/2001 | Pavela |
| 6,883,034 | B1* | 4/2005 | Pelavin .................. H04L 45/00 370/351 |
| 7,313,822 | B2 | 12/2007 | Ben-Itzhak |
| 8,490,193 | B2 | 7/2013 | Yamada et al. |
| 8,490,196 | B2 | 7/2013 | Obes et al. |
| 8,583,899 | B2 | 11/2013 | Ehrman et al. |
| 8,683,546 | B2 | 3/2014 | Dunagan et al. |
| 8,918,885 | B2 | 12/2014 | McClure et al. |
| 8,966,636 | B2 | 2/2015 | Kalman et al. |
| 9,183,397 | B2 | 11/2015 | Futoransky et al. |
| 9,183,560 | B2 | 11/2015 | Abelow |
| 9,317,460 | B2 | 4/2016 | Greiner et al. |
| 9,715,592 | B2 | 7/2017 | Compagna et al. |
| 9,894,090 | B2 | 2/2018 | Hebert et al. |
| 2011/0035803 | A1 | 2/2011 | Obes et al. |
| 2011/0061104 | A1 | 3/2011 | Yamada et al. |
| 2014/0095556 | A1* | 4/2014 | Lee .......................... G06F 16/13 707/824 |
| 2014/0237606 | A1 | 8/2014 | Futoransky et al. |
| 2016/0381050 | A1 | 12/2016 | Shanbhogue et al. |
| 2017/0019421 | A1 | 1/2017 | Hebert et al. |
| 2017/0271027 | A1 | 9/2017 | Childs et al. |
| 2018/0032328 | A1 | 2/2018 | Kannamparambil et al. |
| 2018/0157605 | A1* | 6/2018 | Edwards ................. G06F 21/79 |
| 2018/0365428 | A1* | 12/2018 | Edwards ................. G06F 9/455 |
| 2019/0036961 | A1 | 1/2019 | Gorodissky et al. |
| 2019/0163480 | A1 | 5/2019 | Barrick et al. |
| 2019/0205136 | A1 | 7/2019 | Hu et al. |
| 2019/0266331 | A1* | 8/2019 | Sanchez Diaz ......... G06F 21/00 |
| 2019/0384918 | A1* | 12/2019 | Ndu ....................... G06F 21/577 |
| 2020/0012600 | A1* | 1/2020 | Konoth ................. G06F 21/577 |
| 2020/0057664 | A1* | 2/2020 | Durham .............. G06F 12/1408 |

OTHER PUBLICATIONS

List of IBM Patents or Patent Applications Treated as Related, Jan. 29, 2020, 2 pages.

PTES Technical Guidelines, retrieved from the internet: http://www.pentest-standard.org/index.php/PTES_Technical_Guidelines#Creation_of_Attack_Trees, May 19, 2019, 150 pgs.

U.S. Appl. No. 16/774,059, filed Jan. 28, 2020, Entitled: Combinatorial Test Design for Optimizing Parameter List Testing, First Named Inventor: Andrew C.M. Hicks.

C. Guo, et al., "An automated testing approach for inter-application security in Android," AST May 31-Jun. 7, 2014 Proceedings of the 9th International Workshop on Automation of Software Test, pp. 8-14.

C. Pacheco et al., "Randoop: feedback-directed random testing for Java," OOPSLA Oct. 2007 Companion to the 22nd ACM SIGPLAN Conference on Object-Oriented Programming Systems and Applications Companion, pp. 815-816.

P. Bisht, et al., "NoTamper: automatic blackbox detection of parameter tampering opportunities in web applications," CCS Oct. 2010 Proceedings of the 17th ACM Conference on Computer and Communications Security, pp. 607-618.

"z/OS MVS Programming: Extended Addressability Guide" Retrieved from https://www.ibm.com/support/knowledgecenter/en/SSLTBW_2.1.0/com/.ibm.zos.v2r1.ieaa500/ieaa500141.htm, Sep. 25, 2018, 3 pages.

List of IBM Patents or Patent Applications Treated as Related, Oct. 1, 2018, 2 pages.

U.S. Appl. No. 16/148,092, filed Oct. 1, 2018, Entitled: Cyber Security Testing for Authorized Services, First Named Inventor: Michael R Kasper.

* cited by examiner

CYBER SECURITY FOR SPACE-SWITCHING PROGRAM CALLS

BACKGROUND

The present invention relates to computer systems, and more particularly, to cybersecurity for space-switching program calls.

In a computer system, a kernel is a core component of an operating system that handles various tasks, such as running processes, managing devices, handling interrupts, and the like. Some tasks are performed by the kernel responsive to a system call from a process, while other tasks are performed responsive to system conditions and system management logic. The kernel has access to a memory system of a computer and can control provisioning of the memory system to user processes and operating system processes. The kernel can support virtual addressing through grouping portions of memory into pages to make larger segments or frames of memory available and appear contiguous even if the underlying physical addresses of the memory are non-contiguous.

Computer system architectures can support address space-switching program call (PC) routines operable to execute at a higher level of authority than typical user routines. In an access register (AR) mode, a virtual address used in general registers (GRs) can be combined with the corresponding AR to denote a virtual address in a different address space. It is the responsibility of a PC target routine to verify the AR usage by space-switching PC routines.

SUMMARY

According to a non-limiting embodiment, a system includes a memory system and a processing system operably coupled to the memory system. The memory system includes a plurality of address spaces. The processing system is configured to perform operations including creating a data space from within a primary address space and a primary address space number access list entry referencing the data space. An unauthorized caller routine in a home address space configured to issue a service request including an address space-switching program call from the home address space to a program call target routine in the primary address space. The address space-switching program call references the primary address space number access list entry in the primary address space. A vulnerability identifier associated with the program call target routine is created and logged based on one or more conditions indicative of a cross-memory integrity violation detected responsive to the service request.

According to a non-limiting embodiment, a method includes creating a data space from within a primary address space and a primary address space number access list entry referencing the data space. An unauthorized caller routine in a home address space issues a service request comprising an address space-switching program call from the home address space to a program call target routine in the primary address space. The address space-switching program call references the primary address space number access list entry in the primary address space. A vulnerability identifier associated with the program call target routine is created and logged based on one or more conditions indicative of a cross-memory integrity violation detected responsive to the service request.

According to a non-limiting embodiment, a computer program product includes a computer readable storage medium having program instructions embodied therewith. The program instructions are executable by a processing system to perform a plurality of operations including creating a data space from within a primary address space and a primary address space number access list entry referencing the data space. An unauthorized caller routine in a home address space issues a service request comprising an address space-switching program call from the home address space to a program call target routine in the primary address space. The address space-switching program call references the primary address space number access list entry in the primary address space. A vulnerability identifier associated with the program call target routine is created and logged based on one or more conditions indicative of a cross-memory integrity violation detected responsive to the service request.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
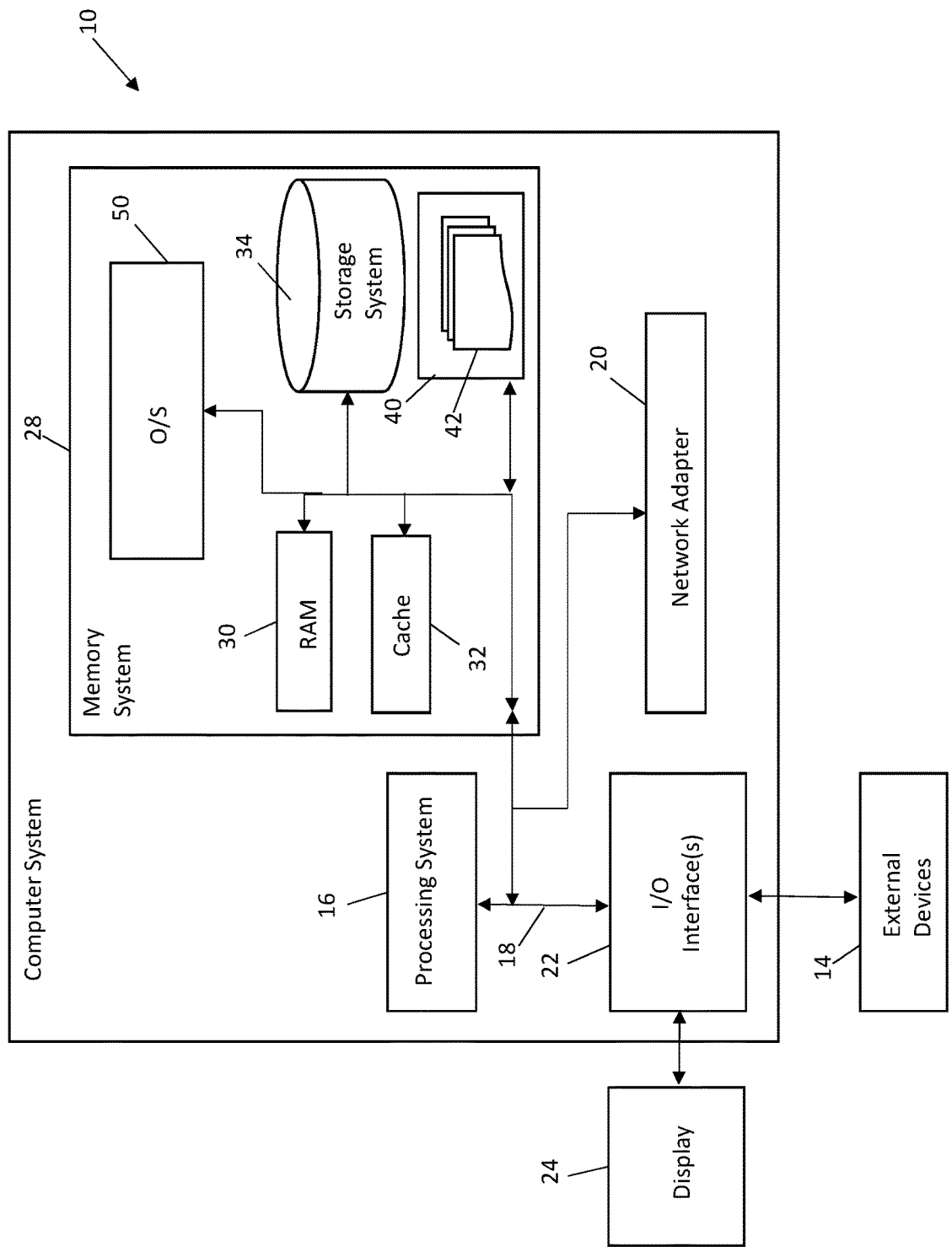
FIG. 1 is a block diagram illustrating a computer system in accordance with various embodiments of the invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, in computer systems that support address space-switching program calls (PCs), space-switching PC routines (also referred to as PC target routines) typically need to disallow Primary Address Space Number Access List (PASN-AL) Access List Entry Tokens (ALETs). An ALET represents a virtual space whose data the executing program is allowed to fetch or potentially update. There are two types of access lists containing ALETs, a PASN-AL and a DU-AL. A PASN-AL is an access list that is associated with the primary address space, the space where the program is currently executing. A Dispatchable Unit Access List (DU-AL) is an access list that is associated with the work unit of the executing program. A vulnerability pattern exists where PASN-AL access is not correctly managed for a space-switching PC routine to prevent an unauthorized program issuing that Program Call from using an ALET on the PASN-AL. A space-switching PC routine may allow access to DU-AL entries, while PASN-AL access attempts should result in an abnormal ending of the space-switching PC routine. This is because at the time that the space-switching PC routine references data using a PASN-AL ALET provided by the caller, the space switch routine's address space is the current primary space, and thus the reference would be to a space identified in the space switch routine's PASN-AL rather than to a space identified in the calling routine's PASN-AL. Depending on the scenario, a denial-of-service attack may be initiated against a product or subsystem, sensitive data may be obtained or changed, or other security and integrity issues may be exploited.

Turning now to an overview of the aspects of the invention, one or more embodiments of the invention address the above-described shortcomings of the prior art. From non-fetch-protected storage, a PC number can be used to derive control blocks associated with a target virtual address space of an address space switch. An authorized program can schedule a Service Request Block (SRB) routine to run in a target address space, and the SRB routine can create a data space as well as create a corresponding PASN-AL entry. A cybersecurity test tool can issue a PC from an unauthorized caller routine using the PASN-AL entry in one or more ALET-qualified parameters to see if the PC target routine rejects the request. If the service request is successful, an integrity vulnerability has been found. For completeness, this can be done for every ALET-qualified parameter as well as for the ALET-qualified parameter area.

The above-described aspects of the invention address the shortcomings of the prior art by performing cybersecurity testing without requiring reverse engineering of executable programs or manual code inspection. The integrity test provided by the cybersecurity testing prevents false positives and does not require access to the source code of the PC target routine. Technical effects and benefits can include extending system integrity tooling to pinpoint a cross-memory vulnerability pattern and help further secure a computer system.

With reference now to FIG. 1, a computer system 10 is illustrated in accordance with a non-limiting embodiment of the present disclosure. The computer system 10 may be based on the z/Architecture, for example, offered by International Business Machines Corporation (IBM). The architecture, however, is only one example of the computer system 10 and is not intended to suggest any limitation as to the scope of use or functionality of embodiments described herein. Regardless, computer system 10 is capable of being implemented and/or performing any of the functionality set forth hereinabove.

Computer system 10 is operational with numerous other computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Further, elements of the computer system 10 can be incorporated in one or more network devices to support computer network functionality, such as a network switch, a network router, or other such network support devices.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system 10 is shown in the form of a computing device, also referred to as a processing device. The components of computer system may include, but are not limited to, a processing system 16 including one or more processors or processing units, a memory system 28, and a bus 18 that operably couples various system components including memory system 28 to processing system 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that are accessible by computer system/server 10, and they include both volatile and non-volatile media, removable and non-removable media.

Memory system 28 can include an operating system (OS) 50, along with computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory system 28 may include at least one program product having a set (e.g., at least one) of program modules that are configured to carry out the functions of embodiments of the disclosure.

The OS 50 controls the execution of other computer programs and provides scheduling, input-output control, file and data management, memory management, and communication control and related services. The OS 50 can also include communication protocol support as one or more drivers to implement various protocol layers in a protocol stack (e.g., transmission control protocol/internet protocol (TCP/IP)) to support communication with other computer systems across one or more computer networks.

The storage system 34 can store a basic input output system (BIOS). The BIOS is a set of essential routines that initialize and test hardware at startup, start execution of the OS 50, and support the transfer of data among the hardware devices. When the computer system 10 is in operation, the processing system 16 is configured to execute instructions stored within the storage system 34, to communicate data to and from the memory system 28, and to generally control operations of the computer system 10 pursuant to the instructions.

Program/utility 40, having a set (at least one) of program modules 42, may be stored in memory system 28 by way of example, and not limitation, as well as the OS 50, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein at an application layer level in a communication protocol stack.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, data archival storage systems, etc.

Figure 2:
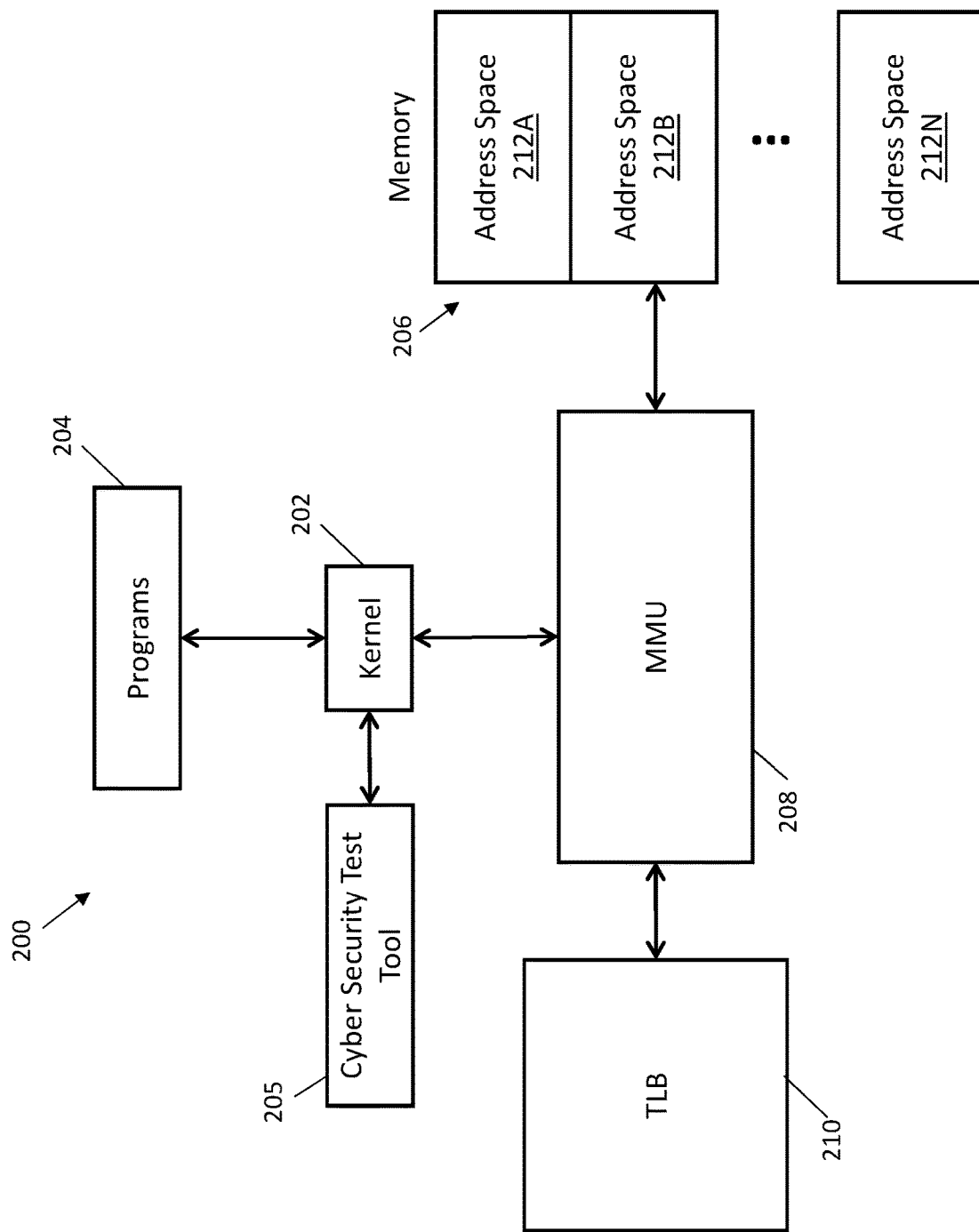
FIG. 2 is a block diagram of a memory management system according to a non-limiting embodiment.

Turning now to a more detailed description of aspects of the present invention, FIG. 2 depicts a block diagram of a memory management system 200 that can be part of the computer system 10 of FIG. 1. The memory management system 200 can include a kernel 202 of the OS 50 of FIG. 1. The kernel 202 can enable provisioning of resources of the computer system 10 of FIG. 1 to support execution of a plurality of programs 204. The kernel 202 may execute directly on the processing system 16 or as part of a virtual machine when supported by a hypervisor, for example. The kernel 202 can access memory 206 through a memory management unit 208, where the memory can be a portion of the memory system 28 of FIG. 1, such as RAM 30. The memory management unit 208 can divide the memory 206 into a plurality of pages addressed through virtual memory addressing. The memory management unit 208 can use a translation lookaside buffer 210 or other structure to support mapping of virtual page addresses to actual (e.g., physical or effective) page addresses in the memory 206. The memory 206 may be subdivided into a plurality of address spaces, such as address space 212A, address space 212B, and address space 212N that each have different access permissions. For example, some programs 204 may normally be limited to accessing the address space 212A, while the other programs 204 may normally be limited to accessing the address space 212B. Where address space switching is supported, one of the programs 204 of address space 212A may call one of the programs 204 of address space 212B, where access constraints are expected to limit permissions of the program 204 of address space 212A in address space 212B. A cybersecurity test tool 205 can be executed that tests for access vulnerabilities related to enforcing cross-memory space access constraints and other security concerns. Further details regarding the cybersecurity testing of the cybersecurity test tool 205 are described with respect to FIGS. 3 and 4.

Figure 3:
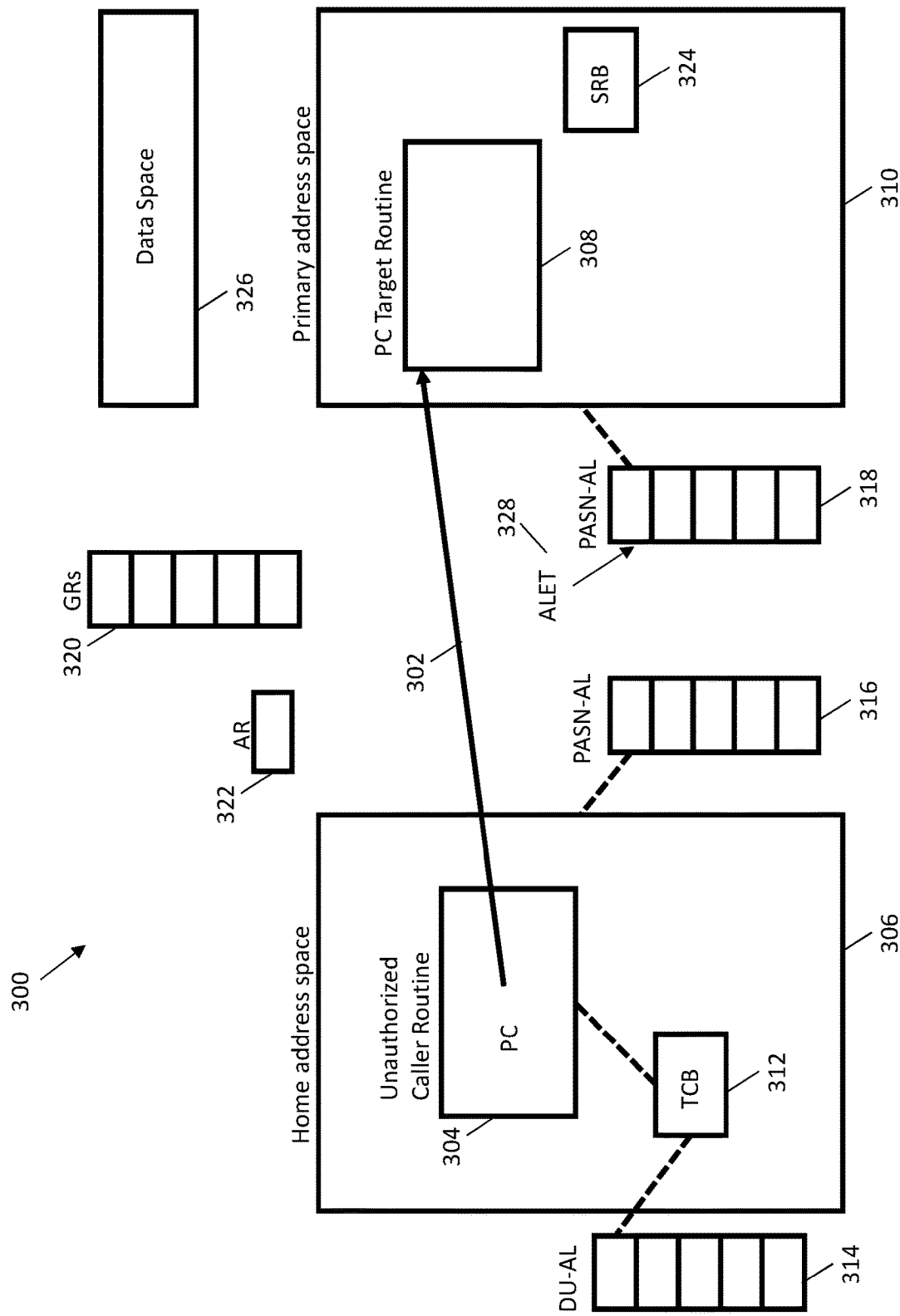
FIG. 3 is a block diagram illustrating a space-switching program call according to a non-limiting embodiment.

FIG. 3 depicts a block diagram 300 of a space-switching program call 302 according to a non-limiting embodiment. The cybersecurity test tool 205 of FIG. 2 can configure an unauthorized caller routine 304 in a home address space 306 to issue a service request as the space-switching program call 302 to a program call target routine 308 in a primary address space 310. For instance, the home address space 306 can be the address space 212A of FIG. 2, and the primary address space 310 can be the address space 212B of FIG. 2, each having separate permissions. The space-switching program call 302 refers to a relationship where the program call target routine 308 executes in a different address space (e.g., primary address space 310) as compared to an address space (e.g., home address space 306) of the unauthorized caller routine 304. Under normal operating conditions, the unauthorized caller routine 304 should be unable to access and/or modify portions of the primary address space 310.

In the example of FIG. 3, a Task Control Block (TCB) 312 represents a unit of work for the unauthorized caller routine 304. The address space containing the TCB 312 is considered the home address space 306, regardless of any space switches that may occur. The address space where a program is currently executing is considered the primary address space 310. There can be two types of access lists for virtual spaces of which an executing program may be typically authorized to access. A DU-AL 314 is associated with a task, such as the TCB 312. A PASN-AL 316 can be associated with the home address space 306, and a PASN-AL 318 can be associated with the primary address space 310. The PASN-AL 316 can be used to reference address/data spaces for sharing between programs 204 (FIG. 2) of the home address space 306, while the PASN-AL 318 is used to reference address/data spaces from within PC Target Routine 308 based on the parameter list provided by Unauthorized Caller Routine 304, of the primary address space 310. A virtual address used within any of a plurality of General Registers (GRs) 320 can be combined with a corresponding Access Register (AR) 322 to denote an address within the primary address space 310.

In embodiments, an authorized program, such as the cybersecurity test tool 205 of FIG. 2, can schedule an SRB routine 324 to run in the primary address space 310. The SRB routine 324 can create a data space 326 as well as create an entry in the PASN-AL 318 for the data space 326, where the entry in the PASN-AL 318 can be identified by an ALET 328. The cybersecurity test tool 205 can then issue the space-switching program call 302 from the unauthorized caller routine 304 using ALET 328 qualified parameters for an entry of the PASN-AL 318 referencing the data space 326 to determine whether the program call target routine 308 rejects the request. A successful invocation implies a failure in security.

A PASN-AL 318 entry for data space 326 can function the same as the PASN-AL 318 for a virtual address space, and thus the usage of the data space 326 creation effectively tests the program call target routine 308 for verification of all ALETs 328 on the PASN-AL 318. The cybersecurity test tool 205 can perform additional integrity checks for special case handling by the program call target routine 308 as well. For example, in AR mode, there can be multiple special-case values for the AR 322, such as where "0" can denote the primary address space 310, "1" can denote a home address space (that was primary prior to a space switch), and "2" can denote the home address space 306 (where the caller unit of work, TCB 312, is anchored). In addition to disallowing access to entries of the PASN-AL 318, it is the responsibility of the program call target routine 308 to modify any "0" to a "1" when the intent of the interface is to access data in the primary space of the caller whether or not provided by ALET 328; otherwise, without the adjustment for this case, caller space addresses can be treated as virtual addresses within the primary address space of the caller. When a primary space of a callee differs from the primary space of the caller, primary-space data provided by the caller must be obtained from the primary space of the caller, not from the primary space of the callee.

As another vulnerability test, an associated virtual address can be changed by the cybersecurity test tool 205 of FIG. 2 to be a known bad value (e.g., 'FFFFFFFF'x) to help ensure recovery is entered when access is attempted. Subsequently, a record of the ARs 322 may be available at the time of an abnormal ending of the program call target routine 308, and a failure to adjust the "0" to be "1" after the space-switching program call 302 can be observed and logged in a record created with a vulnerability identifier associated with the program call target routine 308.

As another example, the data space 326 can be populated with one or more virtual addresses pointing to other blocks within the primary address space 310, which may further contain addresses, where each address has the potential of being paired with an ALET 328. Each pairing can constitute an independent risk to the security and integrity of the computer system 10 of FIG. 1 when the program call target routine 308 has not guarded against usage of the PASN-AL 318 or adjustments of special cases (e.g., "0" to "1" adjustment) for the primary address space 310. Additional test cases can also be supported by the cybersecurity test tool 205 of FIG. 2.

Figure 4:
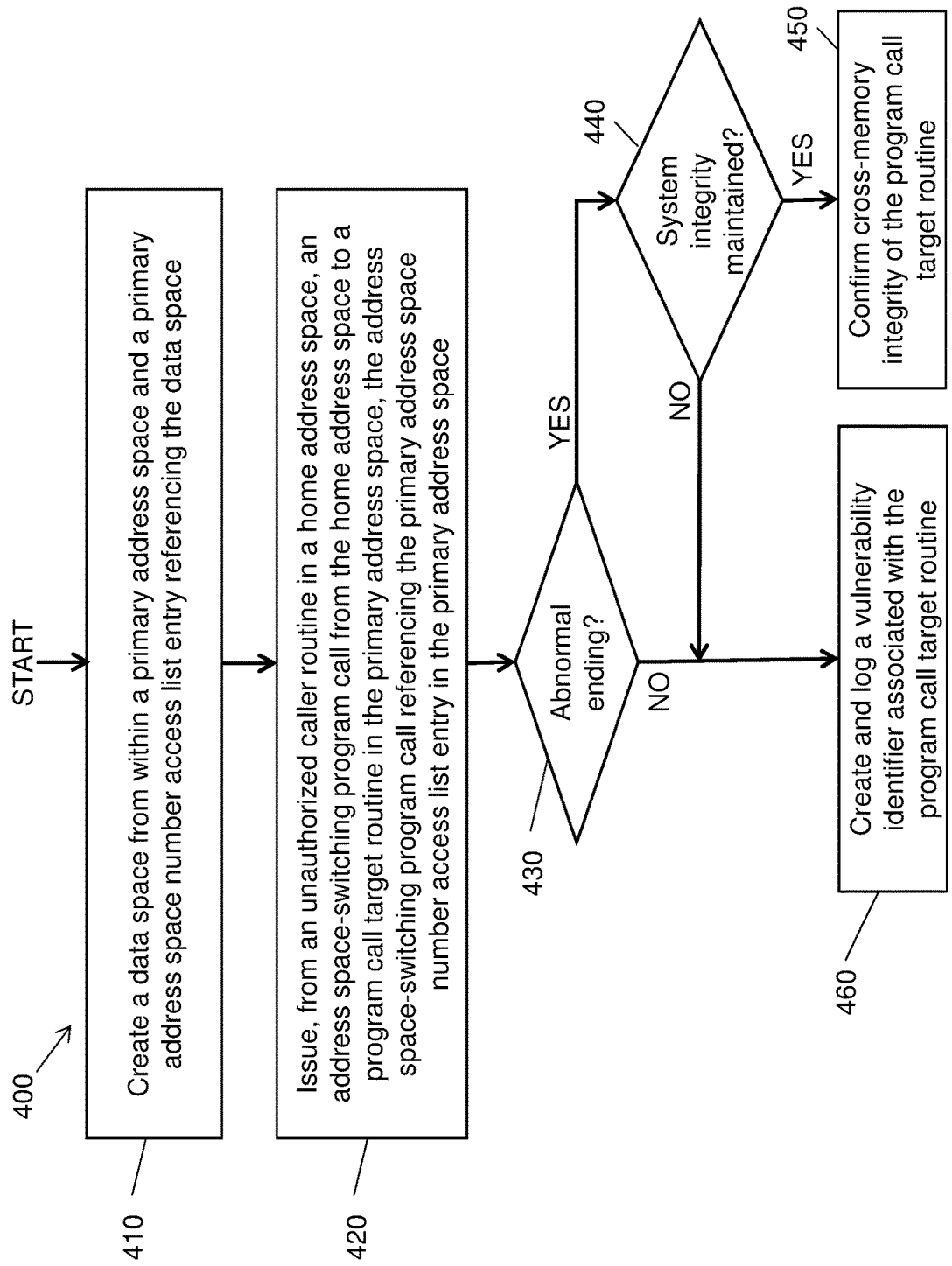
FIG. 4 is a flow diagram illustrating a method according to a non-limiting embodiment.

Turning now to FIG. 4, a flow diagram of a process 400 is generally shown in accordance with an embodiment. The process 400 is described with reference to FIGS. 1-4 and may include additional steps beyond those depicted in FIG. 4. The process 400 can be performed during a cybersecurity check of the computer system 10 to identify potential vulnerability issues with programs 204 that may be generated, for example, by third parties such that direct source code analysis is unavailable.

At block 410, a data space 326 can be created by a program executing within a primary address space 310, for example, by SRB routine 324. The SRB routine 324 can also create a PASN-AL 318 entry referencing the data space 326. The PASN-AL 318 entry is associated with the primary address space of the caller of the service that created the entry.

At block 420, an unauthorized caller routine 304 in home address space 306 can issue a service request including an address space-switching program call (e.g., space-switching program call 302) from the home address space to a program call target routine 308 in the primary address space 310. The cybersecurity test tool 205 can create or configure the unauthorized caller routine 304 to issue the address space-switching program call. The address space-switching program call can reference the PASN-AL 318 entry in the primary address space 310, for instance, through ALET 328.

At block 430, the cybersecurity test tool 205 can monitor for one or more results of the service call to the program call target routine 308, such as determining whether an abnormal ending (ABEND) resulted from the service call as expected. If an abnormal ending resulted, then at block 440, the cybersecurity test tool 205 can further determine whether system integrity was maintained, for instance, by inspecting values associated with the AR 322 after the space-switching program call 302 and abnormal ending to confirm that special-case values for address space references were updated as expected. If system integrity was confirmed as maintained by block 440, then at block 450, the cybersecurity test tool 205 can confirm the cross-memory integrity of the program call target routine 308. Detection of an abnormal ending to the program call target routine 308 responsive to the service request can be used to confirm cross-memory integrity of the program call target routine 308. Results can be captured to a log, database, or file and/or otherwise output.

Other examples of test conditions can include initializing the data space 326 to one or more known values, and verifying that the one or more known values are unmodified after detecting an abnormal ending to the program call target routine 308. Further, an associated virtual address value of the primary address space 310 accessible by the unauthorized caller routine 304 in the home address space can be modified as a virtual address in the available address space to a known bad value to trigger a recovery operation upon an access attempt.

If there is no abnormal ending at block 430 or system integrity is not confirmed as maintained at block 440, then the process 400 can advance to block 460. At block 460, the cybersecurity test tool 205 can create and log a vulnerability identifier associated with the program call target routine 308 based on one or more conditions indicative of a cross-memory integrity violation detected responsive to the service request. For example, a vulnerability list can be created as one or more program call target routines 308 are identified as having a cross-memory integrity risk or other security issues, and the vulnerability list can be incorporated into a report to take further actions. Examples of the one or more conditions indicative of the cross-memory integrity violation can include, for instance, a successful completion of the service request, an update to the data space 326 by the unauthorized caller routine 304 in the home address space, and/or an access register 322 value indicative of the primary address space 310 as an available address space to the unauthorized caller routine 304 in the home address space.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system comprising:
   a memory system comprising a plurality of address spaces; and
   a processing system comprising a computer processor operably coupled to the memory system, the processing system configured to perform a plurality of operations comprising:
     creating a data space from within a primary address space of the memory system and creating a primary address space number access list (PASN-AL) entry referencing the data space;
     issuing, from an unauthorized caller routine in a home address space of the memory system, a service request comprising an address space-switching program call from the home address space to a program call target routine in the primary address space, the address space-switching program call referencing the PASN-AL entry in the primary address space; and
     creating and logging a vulnerability identifier associated with the program call target routine based on one or more conditions indicative of a cross-memory integrity violation detected responsive to the service request, wherein the one or more conditions indicative of the cross-memory integrity violation comprise an access register value indicative of the primary address space as an available address space to the unauthorized caller routine in the home address space.

2. The system of claim 1, wherein the one or more conditions indicative of the cross-memory integrity violation comprise a successful completion of the service request.

3. The system of claim 1, wherein the one or more conditions indicative of the cross-memory integrity violation comprise an update to the data space by the unauthorized caller routine in the home address space.

4. The system of claim 1, wherein the processing system is further configured to perform the operations comprising:
   modifying an associated virtual address value of the primary address space accessible by the unauthorized caller routine in the home address space as a virtual address in the available address space to a known bad value to trigger a recovery operation upon an access attempt.

5. The system of claim 1, wherein the processing system is further configured to perform the operations comprising:
   confirming cross-memory integrity of the program call target routine based on detecting an abnormal ending to the program call target routine responsive to the service request.

6. The system of claim 5, wherein the processing system is further configured to perform the operations comprising:
   initializing the data space to one or more known values; and
   verifying that the one or more known values are unmodified after detecting the abnormal ending to the program call target routine.

7. A method comprising:
   creating, by a processing system comprising a computer processor operably coupled to a memory system, a data space from within a primary address space of the memory system and creating a primary address space number access list (PASN-AL) entry referencing the data space;
   issuing, from an unauthorized caller routine in a home address space of the memory system, a service request comprising an address space-switching program call from the home address space to a program call target routine in the primary address space, the address space-switching program call referencing the PASN-AL entry in the primary address space; and
   creating and logging a vulnerability identifier associated with the program call target routine based on one or more conditions indicative of a cross-memory integrity violation detected responsive to the service request, wherein the one or more conditions indicative of the cross-memory integrity violation comprise an access register value indicative of the primary address space as an available address space to the unauthorized caller routine in the home address space.

8. The method of claim 7, wherein the one or more conditions indicative of the cross-memory integrity violation comprise a successful completion of the service request.

9. The method of claim 7, wherein the one or more conditions indicative of the cross-memory integrity violation comprise an update to the data space by the unauthorized caller routine in the home address space.

10. The method of claimer 7, further comprising:
    modifying an associated virtual address value of the primary address space accessible by the unauthorized caller routine in the home address space as a virtual address in the available address space to a known bad value to trigger a recovery operation upon an access attempt.

11. The method of claim 7, further comprising:
confirming cross-memory integrity of the program call target routine based on detecting an abnormal ending to the program call target routine responsive to the service request.

12. The method of claim 11, further comprising:
initializing the data space to one or more known values; and
verifying that the one or more known values are unmodified after detecting the abnormal ending to the program call target routine.

13. A computer program product comprising a computer readable storage medium having program instructions embodied therewith, the program instructions executable by a processing system comprising a computer processor operably coupled to a memory system to perform a plurality of operations comprising:
creating a data space from within a primary address space of the memory system and creating a primary address space number access list (PASN-AL) entry referencing the data space;
issuing, from an unauthorized caller routine in a home address space of the memory system, a service request comprising an address space-switching program call from the home address space to a program call target routine in the primary address space, the address space-switching program call referencing the PASN-AL entry in the primary address space; and
creating and logging a vulnerability identifier associated with the program call target routine based on one or more conditions indicative of a cross-memory integrity violation detected responsive to the service request, wherein the one or more conditions indicative of the cross-memory integrity violation comprise an access register value indicative of the primary address space as an available address space to the unauthorized caller routine in the home address space.

14. The computer program product of claim 13, wherein the one or more conditions indicative of the cross-memory integrity violation comprise a successful completion of the service request.

15. The computer program product of claim 13, wherein the one or more conditions indicative of the cross-memory integrity violation comprise an update to the data space by the unauthorized caller routine in the home address space.

16. The computer program product of claim 13, wherein the program instructions executable by the processing system are further configured to perform the operations comprising:
modifying an associated virtual address value of the primary address space accessible by the unauthorized caller routine in the home address space as a virtual address in the available address space to a known bad value to trigger a recovery operation upon an access attempt.

17. The computer program product of claim 13, wherein the program instructions executable by the processing system are further configured to perform the operations comprising:
confirming cross-memory integrity of the program call target routine based on detecting an abnormal ending to the program call target routine responsive to the service request.

18. The computer program product of claim 17, wherein the program instructions executable by the processing system are further configured to perform the operations comprising:
initializing the data space to one or more known values; and
verifying that the one or more known values are unmodified after detecting the abnormal ending to the program call target routine.

* * * * *